United States Patent [19]

Brola

[11] 4,118,934
[45] Oct. 10, 1978

[54] PROCESS AND APPARATUS FOR TRANSFORMING HEAT AT A RELATIVELY LOW TEMPERATURE INTO POWER OR ENERGY

[75] Inventor: Gabriel Brola, Nogent-sur-Marne, France

[73] Assignee: Enterprise Industrielle de Chaudronnerie, France

[21] Appl. No.: 668,671

[22] Filed: Mar. 19, 1976

[30] Foreign Application Priority Data

Mar. 21, 1975 [FR] France .................. 75 08893

[51] Int. Cl.² ............................. F01K 25/06
[52] U.S. Cl. ...................... 60/647; 60/690; 62/238; 62/335
[58] Field of Search .............. 60/643, 645, 651, 653, 60/647, 671, 690; 62/335 XR, 467, 500, 238

[56] References Cited

U.S. PATENT DOCUMENTS

| | | | |
|---|---|---|---|
| 1,871,244 | 8/1932 | Steuart | 62/500 |
| 3,153,442 | 10/1964 | Silvern | 62/467 |
| 3,241,327 | 3/1966 | La Fleur | 62/467 |
| 3,636,706 | 1/1972 | Minto | 60/651 |
| 3,971,211 | 7/1976 | Wethe et al. | 60/647 |

FOREIGN PATENT DOCUMENTS 1,204,119  9/1970  United Kingdom .............. 60/655

Primary Examiner—Allen M. Ostrager
Assistant Examiner—Stephen F. Husar
Attorney, Agent, or Firm—Stevens, Davis, Miller & Mosher

[57] ABSTRACT

The invention relates to a process for transforming heat having a low temperature into motive power, wherein heat which is carried by a first fluid is used for heating a condensable second fluid which participates in a thermodynamic cycle and wherein the second fluid is expanded thereby producing motive power or thermic energy having a higher potential. The apparatus for putting into practice this process comprises a superheater, in which the first fluid carrying the heat to be transformed and the second fluid circulate, an expansion device for the second fluid which produces motive power, a heat exchanger in which the expanded second fluid and a compressed second fluid circulate, a condenser for transforming the expanded second fluid into a liquid, a compressor for feeding the liquid second fluid to the superheater via the heat exchanger, and a gaseous fluid circulating through the condensor which mixes via ports and a convergent nozzle in the superheater with the first fluid. An environmental conditioning apparatus may be connected to receive a portion of the output from the expansion device or the condensor to effect a heating or cooling operation.

6 Claims, 6 Drawing Figures

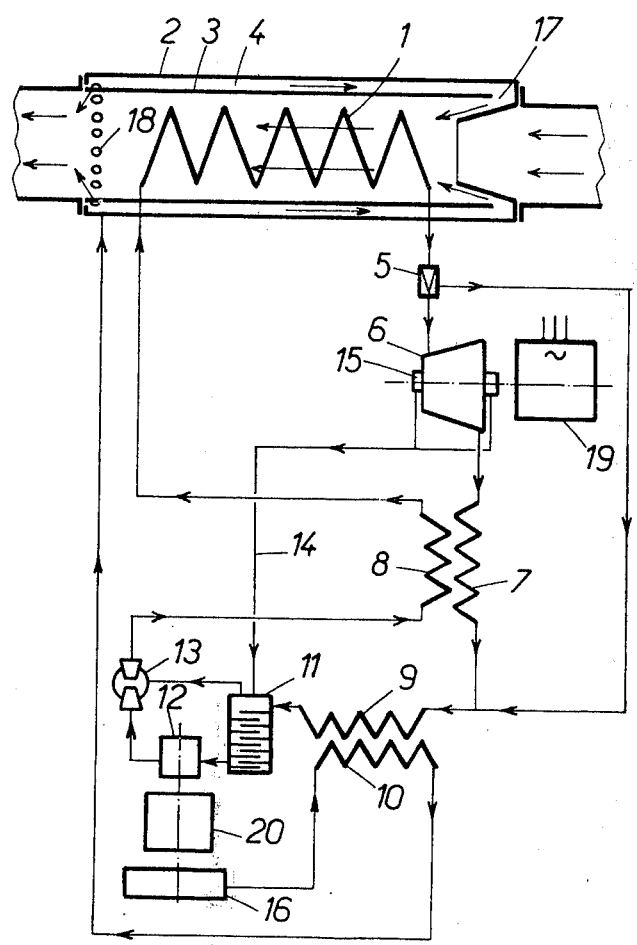
FIG.: 1

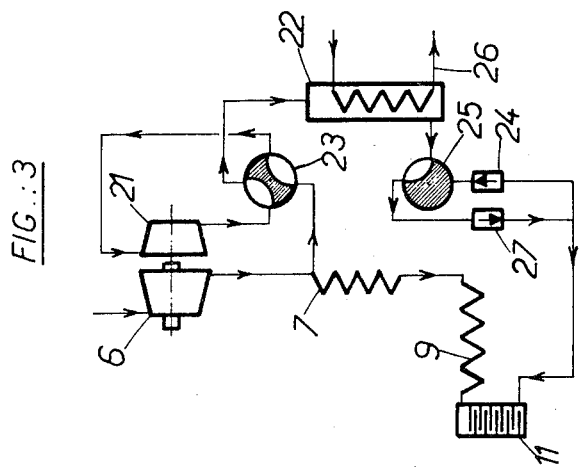
FIG.:3
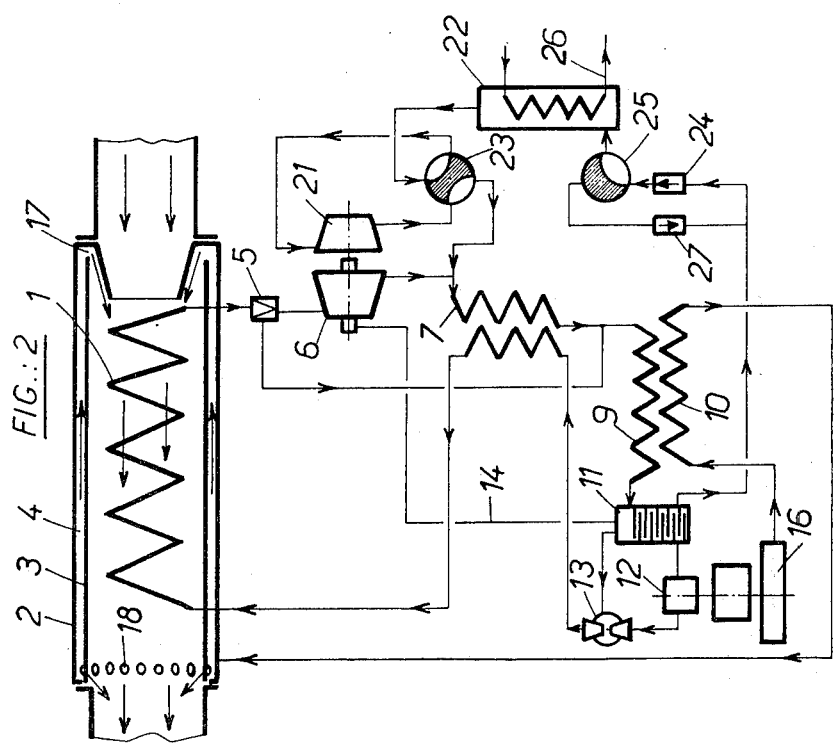
FIG.:2

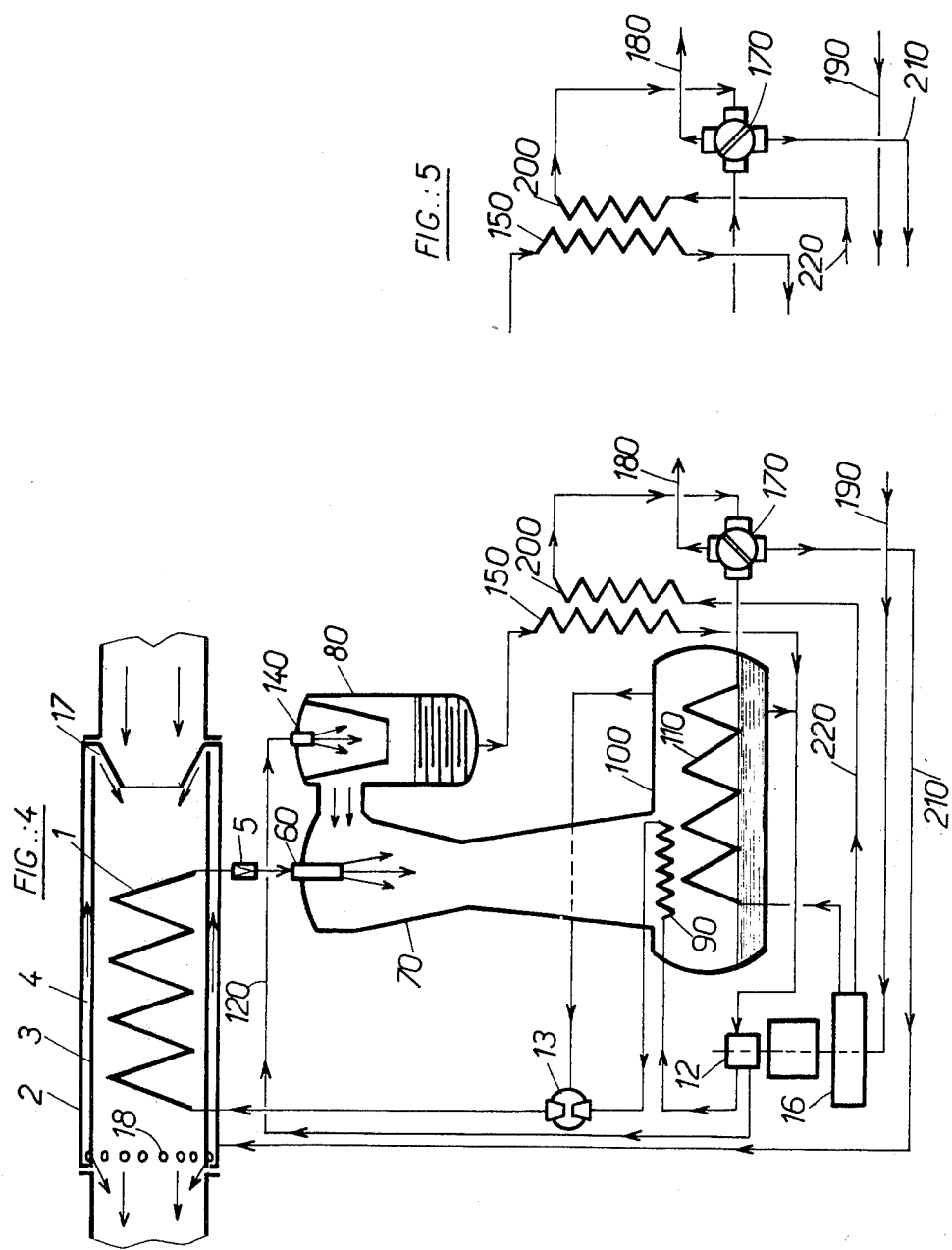

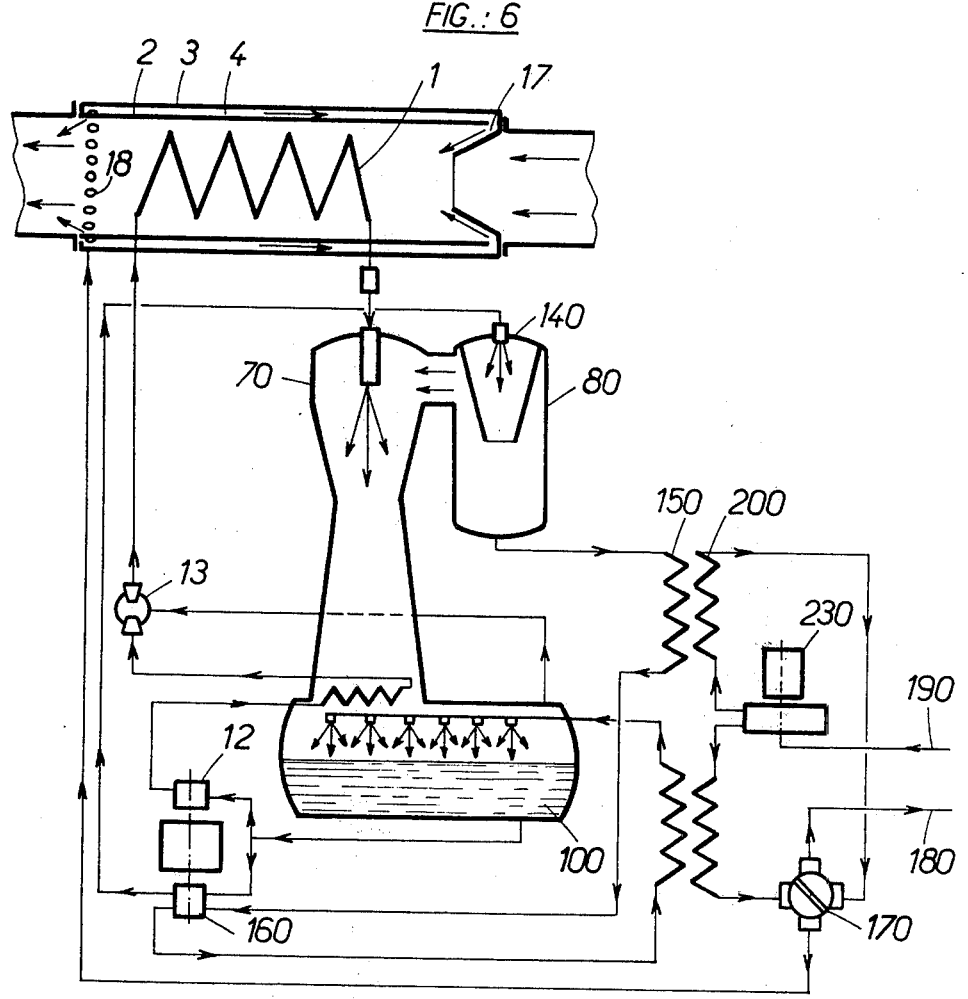
FIG.: 6

PROCESS AND APPARATUS FOR TRANSFORMING HEAT AT A RELATIVELY LOW TEMPERATURE INTO POWER OR ENERGY

This invention relates to the transformation of low-grade, degenerated heat, which originates for instance from the combustion gases of various industrial apparatus such as boilers, furnaces, driers, etc. into motive power or energy having a higher thermic potential for all kinds of uses, in particular for environmental-conditioning such as heating or cooling.

It may also be used for recuperating heat at a relatively low temperature from the cooling waters of condensers, from geothermic warm waters or even from solar heat.

It must be mentioned that about 90% of the energy used in industry has a thermic origin and that the apparatus which make use of it has a low efficiency, which means that 60–75% of this energy is simply thrown away in the form of low-grade heat at a low temperature.

Consequently, the objects of the invention are to provide a process for recuperating and reconverting low grade heat into power by means of a two fluid thermodynamic cycle, and apparatus for the application of this process.

Preferably the low grade heat carrying fluid and a condensable fluid having a low vapor tension are brought into contact. Said condensable fluid must possess particular thermodynamic properties which permits its transformation into superheated vapor under pressure by action of the heat to be recovered. As this vapor is expanded in an expansion engine or a turbine, said heat may be thus converted into motive power and said motive power will be used for driving for instance either a generator of electric current or a heat pump compressor for producing warm or cold air as desired.

In order to condense said vapor on the lower isotherm curve of the cycle, another heat-carrying fluid is used. This other fluid may be air at a low pressure or water in the liquid state at a low temperature.

The invention will be better understood by reference to the following detailed description when considered in connection with the accompanying drawing in which:

FIG. 1 is a diagrammatic view of an equipment for transforming heat into electric energy.

FIG. 2 is a view similar to FIG. 1, in which a turbo-compressor apparatus is adapted to environmental-conditioning, the installation being adapted for cooling.

FIG. 3, as a partial view, corresponds to FIG. 2, the installation being adapted for heating.

FIGS. 4 and 5 are similar to FIGS. 2 and 3, but with the implementation of a thermo-compressor.

FIG. 6 is a view similar to FIG. 4 for a modification thereof.

In the embodiment of the invention shown on FIG. 1 the combustion gases or first fluid carrying heat to be recovered enter a tubular exchanger 1, called a superheater, which is provided with fins and located in a double wall sleeve 2–3, or jacket with an annular space 4 for circulating an air current.

The second fluid, which is circulated in a liquid state in this exchanger, is superheated under the influence of the heat of combustion gases or first fluid. As this fluid is compressed under a pressure which is equal or superior to its critical pressure, it remains liquid in spite of superheating. At the outlet of the superheater the liquid flows through a three-way valve or flow regulator 5 and enters expansion engine or turbine 6. Because of pressure the liquid is instantaneously transformed into vapor and because of a complete expansion of this vapor its thermic energy is transformed into power. At the outlet of the turbine the expanded vapor flows through a first exchanger 7, in which a part of its heat is extracted by the second fluid which circulates in a circuit 8. At the outlet of the first exchanger the vapor enters a condenser 9 in which it is transformed into a liquid. Condensation heat is taken away by a third cooling fluid, which in the present case is low pressure air that circulates in circuit 10 of said condenser. The liquid is then admitted into a condensate separator 11 from which a circulation pump 12, or first compressor, pumps it under a high pressure to an ejector 13. In ejector 13 the liquid works as a driving fluid and produces a suction in separator 11. Said separator is also connected by a line 14 to seals 15 of the turbine so as to recover the vapor leaks that may possibly occur.

At the outlet of the ejector the fluid under pressure flows across the circuit 8 of the desuperheater in which it takes up a part of the heat of the expanded vapor of the second fluid. Thereafter the liquid enters exchanger 1 of the superheater and a new circulation cycle of the second fluid begins.

The third fluid of the cycle is atmospheric air pumped by a compressor 16, or second compressor, in the circuit 10 of the condenser. This air, warmed up by condensation heat, then enters the annular space of the superheater. A part of this air flows along the superheater for recovering the heat lost by the walls. This air is introduced through convergent constriction 17 amidst the combustion gases at the inlet of the superheater. A part of this condensation heat and of the heat lost by the walls is thus recycled. Another part of the warm air issues from ports 18 for being evacuated with the combustion gases. The heat of this air is irretrievably lost because of the irreversibility of the cycle.

Expansion engine or steam turbine 6 which produces power may for instance drive a generator 19 for producing electric current.

Circulation pump 12 (or first compressor) and compressor 16 (or second compressor) may be driven independently from each other by an electric motor 20 having a variable speed. This makes the starting of the installation easier and permits the adjustment of the vapor flow of the turbine as a function of the flow and temperature of the combustion gases through the superheater.

When it is desired to use the heat recovered in the combustion gases for ensuring a conditioning of the environment, turbine 6 may then be coupled to a third compressor 21 (FIG. 2). To the cycle of power production another thermic cycle is added, namely a heat-pump cycle. This new complex cycle offers the advantage of permitting the production of heat or cold for environmental-conditioning without another electric source being necessary for driving the compressor.

The working principle of the second cycle is illustrated in FIG. 2.

Compressor 21 which is driven by expansion engine or turbine 6 sucks in primary fluid from a storage tank 22 (or second exchanger) via a four-way valve 23. Compressed vapor, issuing from compressor 21, flows again through four-way valve 23 and enters circuit 7 of the first exchanger of the binary cycle. The vapor enters condenser 9 and condensation heat is transferred to the air (third cooling fluid) that circulates in circuit 10. The fluid which is condensed then enters separator 11 and returns to tank 22 via a first check valve 24 and a control valve 25 that is provided for adjusting the expansion. Because of the low-pressure predominating in the tank, the liquid is gradually transformed into vapor by heat absorption. In consequence this storage tank works as an evaporator. It contains an exchanger 26 in which the cooling fluid (or fourth fluid) of the environmental-conditioning circulates.

When the environmental-conditioning installation has to be supplied with heat, the group works as shown in FIG. 3. This mode of working is obtained simply by modifying the positionings of two-valves 23 and 25. Compressor 21 pumps compressed vapor into tank 22 through valve 23. Exchanger 26, in which the fluid of the installation is circulated, evacuates the condensation heat of the second fluid. In this case the tank and exchanger combination works as a condenser. The condensed fluid flows through valve 25 and second check valve 27 for finally arriving at separator 11. At the entry of circuit 7 a part of the vapor issuing from the turbine is tapped for supplying the compressor 21 via valve 23.

Condensation heat absorbed by exchanger 26 is used for warming up the environmental-conditioning installation.

The cycle for producing power works in juxtaposition with the heat-pump cycle, both cycles using the same driving fluid.

With this arrangement the efficiency of the whole heat recuperation cycle is very high, for the heat pump recovers the heat lost in the condenser of the power production cycle and rises its thermic potential without consuming any electric current.

For producing cold or warm air in environmental-conditioning it is possible, while using heat at a low temperature, to make use of the same binary cycle, but embodied with a thermocompressor.

Such an arrangement offers the advantage, in comparison with the one including a turbocompressor, to be simpler and accordingly to require a smaller investment; however its thermodynamic efficiency is lower.

The principle of its working according to the invention is illustrated in FIG. 4.

Just as in the precedent case the primary fluid, issued from superheater 1 under its critical pressure, is superheated; via the flow regulator 5 it issues through the nozzle 60.

Because of vapor expansion, thermic energy is transformed into kinetic energy. Vapor having a great speed is sent through an ejector 70 and generates a partial vacuum in an evaporator 80. Consequently a part of liquid contained in the evaporator will be vaporized.

The soft vapor arising from the evaporator is drawn along by the quickening vapor of the ejector; the mixture is then compressed in the divergent part of the ejector. At the outlet of this divergent part there is placed a first exchanger in order to cool this vapor and thus recover a heat amount which would be lost in the condenser. The vapor mixture then enters condenser 100 in which a circuit 110 is placed for circulating condensation air (the third cooling fluid). The condensed vapor is recaptured in a liquid state by circulation pump 12 and pumped under pressure towards sprayer 140 of evaporator 80 on one hand and towards the first exchanger 90 on the other hand. This liquid then flows through ejector 13 for entering again superheater 1.

Ejector 13 maintains a partial vacuum in condenser 100 so that residual vapor, which would remain uncondensed, will be thus evacuated.

The circuit of the cooling cycle is embodied in a second circuit 120 of pump 12 which feeds sprayer 140 of evaporator 80.

One part of the sprayed fluid will be evaporated owing to the evaporator vacuum. Heat absorbed by evaporation will cool the fluid remaining within the evaporator. Thereafter, the cooled fluid flows in circuit 150 of an exchanger (or second exchanger) and cools the air circulating in circuit 200. At the outlet of circuit 150 the liquid will be heated and sucked by circulation pump 12 (first compressor) and pumped anew in the cycle circuit.

The third fluid of the cycle is air, pumped at a low pressure by second compressor 16 in the first circuit 110 of the condenser. The air, warmed up by condensation heat of the vapor mixture, passes through four-way valve 170 and is directed towards utilization equipments — that is to say, the environmental-conditioning installation — through line 180. The return air of the installation arrives by line 190 to the inlet of compressor 16 and from hence it is anew pumped through line 220 in the second circuit 200 of the second exchanger. The heat of the incoming air from the installation is recovered by circuit 150 and introduced in the cycle of the heat pump. The air that issues from circuit 200 goes through 4-way valve 170 again and is pumped into superheater 1. A part of this air circulates in the annular space 4 for recovering the heat lost by the walls. This air is introduced amidst the combustion gases by the divergent part 17 and its heat is partly recycled. Another part of this air is pumped through ports 18 in the exhaust gases and consequently its heat is lost because of cycle irreversibility.

When the environmental-conditioning installation has to be supplied with cold air, its working will be as illustrated in FIG. 5.

As the position of valve 170 is modified, the air arriving from circuit 110 of condenser 100 is pumped via valve 170 in superheater 1 through line 210. The second part of the air pumped by the second compressor 16 passes through line 220 across circuit 200 of the second exchanger in which it is cooled. Thereafter it is directed via valve 170 and line 180 towards the installation equipments.

Thus by turning valve 170 the environmental-conditioning installation may be supplied either with warm air or with cold air.

In the present arrangement and also in the precedent arrangement with a turbocompressor as well, two cycles work in juxtaposition, namely a cycle for transforming recovered heat into mechanic or kinetic energy and a cycle for transforming heat into thermic (cold or warm) energy having a higher thermic potential.

In this cycle embodied with a thermocompressor, the latter may be selected with one or several stages according to the temperature of the heat to be recovered and the fluid used. In a like manner the condenser may be of the surface or mixing type. In the latter case, for instance, the working cycle is shown on FIG. 6. Compressor 16 will be then replaced by a second circulation pump 160. On the other hand, air circulation will be ensured by a motor-fan group 230 which will form a part of the environmental-conditioning installation.

The second fluid chosen as a thermodynamic fluid in the cycles above-described may differ as a function of the temperature of the heat to be recovered from the first fluid.

For relatively high temperatures of 300°–400° C., it is advantageous to use for said second fluid one of the saturated hydrocarbons of the formenic series. Being hydrogen saturated, they have a great chemical stability at high temperatures.

The most stable fluid at high temperatures is propane; it is the only one practically used for temperatures above 350° C.

For temperatures lower than 350° C. one generally uses such saturated hydrocarbons as tetramethylmethane or decane; for temperatures lower than 200° C., fluorinated carbonated fluids such as freon 114 or 21; and for temperatures less than 100° C., freon 12.

The embodiments described were given as illustrative examples only and the invention will be defined by the appended claims.

I claim:

1. An apparatus for transforming relatively low temperature heat contained in a first fluid into power or energy by exchanging the relatively low temperature of heat of said first fluid with a cooler second fluid comprising:
   means for compressing said second fluid to a critical pressure to produce a liquid compressed second fluid,
   means for heating said liquid compressed second fluid by a heat exchange to produce a preheated liquid second fluid,
   means for superheating said preheated liquid second fluid by a heat exchange with said relative low temperature first fluid to produce a superheated liquid second fluid at said critical pressure,
   means for expanding said superheated liquid second fluid to produce power or energy and to produce a first vaporized fluid,
   means for cooling said first vaporized fluid by a heat exchange with said liquid compressed second fluid to produce a cooled first vaporized fluid,
   means for condensing said cooled first vaporized fluid by a heat exchange with a gaseous third fluid to produce said second fluid, and
   means for mixing said gaseous third fluid with said relative low temperature first fluid; said means for superheating and means for mixing comprising:
   a casing through which said relatively low temperature heated first fluid passes,
   a jacket surrounding said casing including an inlet for said gaseous third fluid, first ports located at a first extremity of said casing for coupling said jacket with the inside of said casing, second ports located at a second extremity of said casing, a tubular exchanger inside said casing for carrying said preheated liquid second fluid, and a convergent nozzle directing said first fluid through the said tubular exchanger, said convergent nozzle having a larger outer section facing said second ports to thereby channel said gaseous third fluid through and around said tubular exchanger.

2. An apparatus for transforming relatively low temperature heat contained in a first fluid into power or energy by exchanging the relatively low temperature of heat of said first fluid with a cooler second fluid comprising:
   means for compressing said second fluid to a critical pressure to produce a liquid compressed second fluid,
   means for heating said liquid compressed second fluid by a heat exchange to produce a preheated liquid second fluid,
   means for superheating said preheated liquid second fluid by a heat exchange with said relative low temperature first fluid to produce a superheated liquid second fluid at said critical pressure,
   means for expanding said superheated liquid second fluid to produce power or energy and to produce a first vaporized fluid,
   means for cooling said first vaporized fluid by a heat exchange with said second compressed second fluid to produce a cooled first vaporized fluid,
   means for condensing said cooled first vaporized fluid by a heat exchange with a gaseous third fluid to produce said second fluid,
   means for mixing said gaseous third fluid with said relative low temperature first fluid,
   means for converting a part of said second fluid by a heat exchange with a fourth fluid circulating in an environmental conditioning apparatus to a second vaporized fluid,
   means for compressing said second vaporized fluid to produce a compressed vaporized fluid, and
   means for combining said compressed vaporized fluid with said first vaporized fluid and for feeding said combination to said means for cooling.

3. The apparatus according to claim 2 further comprising:
   a first valve means for coupling said second vaporized fluid to said means for compressing and for coupling said compressed vaporized fluid to said means for combining, and
   a second valve means for coupling said part of said second fluid to said means for converting.

4. An apparatus for transforming relatively low temperature heat contained in a first fluid into power or energy by exchanging the relatively low temperature of heat of said first fluid with a cooler second fluid comprising:
   means for compressing said second fluid to a critical pressure to produce a liquid compressed second fluid,
   means for heating said liquid compressed second fluid by a heat exchange to produce a preheated liquid second fluid,
   means for superheating said preheated liquid second fluid by a heat exchange with said relative low temperature first fluid to produce a superheated liquid second fluid at said critical pressure,
   means for expanding said superheated liquid second fluid to produce power or energy and to produce a first vaporized fluid,
   means for cooling said first vaporized fluid by a heat exchange with said liquid compressed second fluid to produce a cooled first vaporized fluid,
   means for condensing said cooled first vaporized fluid by a heat exchange with a gaseous third fluid to produce said second fluid,
   means for mixing said gaseous third fluid with said relative low temperature first fluid,
   means for compressing a portion of said first vaporized fluid to produce a compressed vaporized fluid, and
   means for condensing said compressed vaporized fluid by a heat exchange with a fourth fluid circulating in an environmental conditioning apparatus to produce said second fluid.

5. The apparatus according to claim 4 further comprising:
   a first valve means for coupling said first vaporized fluid to said means for compressing a portion of said first vaporized fluid and for coupling said compressed vaporized fluid to said means for condensing, and
   a second valve means for controlling the flow of said second fluid produced by said means for condensing said compressed vaporized fluid to said means for condensing said cooled first vaporized fluid.

6. An apparatus for transforming relatively low temperature heat contained in a first fluid into power or energy by exchanging the relatively low temperature of heat of said first fluid with a cooler second fluid comprising:
   means for compressing said second fluid to a critical pressure to produce a liquid compressed second fluid,
   means for heating said liquid compressed second fluid by a heat exchange to produce a preheated liquid second fluid,
   means for superheating said preheated liquid second fluid by a heat exchange with said relatively low temperature first fluid to produce a superheated liquid second fluid at said critical pressure,
   means for expanding said superheated liquid second fluid to produce power or energy and to produce a first vaporized fluid,
   means for cooling said first vaporized fluid by a heat exchange with said liquid compressed second fluid to produce a cooled first vaporized fluid,
   means for condensing said cooled first vaporized fluid by a heat exchange with a gaseous third fluid to produce said second fluid,
   means for mixing said gaseous third fluid with said relative low temperature first fluid, and
   said means for condensing comprising a condenser feeding a condensate separator, said condensate separator feeding said second fluid to said means for compressing, said means for compressing feeding an ejector and said ejector feeding said liquid compressed second fluid to said means for heating.

* * * * *